(12) United States Patent
Kim (10) Patent No.: US 11,269,528 B2
(45) Date of Patent: Mar. 8, 2022

(54) DATA STORAGE DEVICE WITH REDUCED MEMORY ACCESS OPERATION METHOD THEREOF AND CONTROLLER THEREFOR

(71) Applicant: SK hynix Inc., Icheon-si (KR)

(72) Inventor: Jin Pyo Kim, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 98 days.

(21) Appl. No.: 16/676,336

(22) Filed: Nov. 6, 2019

(65) Prior Publication Data

US 2020/0301586 A1 Sep. 24, 2020

(30) Foreign Application Priority Data

Mar. 18, 2019 (KR) .......................... 10-2019-0030314

(51) Int. Cl.
*G06F 3/06* (2006.01)
*G06F 12/02* (2006.01)
*G06F 12/0882* (2016.01)
*G06F 11/10* (2006.01)

(52) U.S. Cl.
CPC ............ *G06F 3/064* (2013.01); *G06F 3/0608* (2013.01); *G06F 3/0652* (2013.01); *G06F 3/0656* (2013.01); *G06F 3/0679* (2013.01); *G06F 11/1068* (2013.01); *G06F 12/0253* (2013.01); *G06F 12/0882* (2013.01); *G06F 2212/7211* (2013.01)

(58) Field of Classification Search
CPC ...... G06F 3/064; G06F 3/0652; G06F 3/0656; G06F 3/0679; G06F 11/1068; G06F 12/0253; G06F 12/0882; G06F 2212/7211
See application file for complete search history.

(56) References Cited

U.S. PATENT DOCUMENTS

2011/0029720 A1* 2/2011 Lu .................... G06F 12/0246
711/103
2016/0188208 A1* 6/2016 Kim .................... G06F 12/0253
711/103
2017/0212831 A1* 7/2017 Lee .................... G06F 12/023

FOREIGN PATENT DOCUMENTS

KR 10-2016-0071703 6/2016
KR 10-2017-0050953 5/2017

* cited by examiner

*Primary Examiner* — Michelle T Bechtold
(74) *Attorney, Agent, or Firm* — Perkins Coie LLP (57) ABSTRACT

A data storage device may include: a memory array comprising a plurality of blocks, each block including a plurality of pages and a controller in communication with the memory array and comprising a memory buffer, the controller configured to maintain attribute information associated with each block and each page of the memory array, the controller further configured to read data from a requested page in the memory array responsive to an external request, store the read data in a first region of the memory buffer to output the read data responsive to the external request, and copy the read data from the first region of the memory buffer into a second region of the memory buffer upon a determination based on the attribute information that the requested page is included in a supposed-to-be-erased region.

12 Claims, 8 Drawing Sheets

DATA STORAGE DEVICE WITH REDUCED MEMORY ACCESS OPERATION METHOD THEREOF AND CONTROLLER THEREFOR

CROSS-REFERENCES TO RELATED APPLICATION

This patent document claims the priority and benefits of Korean application number 10-2019-0030314, filed on Mar. 18, 2019, which is incorporated herein by reference in its entirety.

TECHNICAL FIELD

The technology and implementations disclosed in this patent document generally relate to a semiconductor integrated device, and more particularly, to a data storage device, an operation method thereof and a controller therefor.

BACKGROUND

A storage device refers to a device that is used to store and retrieve data and performs data input/output operations according to a request from another device such as a host device. The storage device may use a variety of storage media to store data.

A storage device using flash memory devices for persistent data storage can be put through a limited number of program/erase cycles before becoming unreliable.

For this reason, wear leveling algorithms may be used to prolong the life of the storage device by distributing erasures and re-writes evenly across the storage medium.

SUMMARY

In an embodiment, a data storage device may include: a memory array comprising a plurality of blocks, each block including a plurality of pages; and a controller in communication with the memory array and comprising a memory buffer, the controller configured to maintain attribute information associated with each block and each page of the memory array, the controller further configured to: read data from a requested page in the memory array responsive to an external request; store the read data in a first region of the memory buffer to output the read data responsive to the external request; and copy the read data from the first region of the memory buffer into a second region of the memory buffer upon a determination based on the attribute information that the requested page is included in a supposed-to-be-erased region.

In an embodiment, a data storage device may include: a memory array comprising a plurality of blocks, each block including a plurality of pages; and a controller in communication with the memory array and a host device and comprising a memory buffer, the controller configured to maintain attribute information associated with each block and each page of the memory array, the controller further configured to: receive a read request and the associated read address from the host device; read data from the read address in the memory array based on the read request of the host device; store the read data in a first region of the memory buffer to output the read data to the host device; and copy the read data from the first region into a second region of the memory buffer upon a determination based on the attribute information that a page corresponding to the read address is included in a supposed-to-be-erased region.

In an embodiment, there is provided a method for operating a data storage device which includes a storage including a plurality of blocks each divided into a plurality of pages and a controller including a memory buffer and configured to control the storage. The method may include: maintaining, by the controller, attribute information on each of the blocks and pages; reading, by the controller, data from a requested page in the memory array responsive to an external request, and storing the read data in a first region of the memory buffer to output the read data responsive to the external request; checking, by the controller, whether the requested page is included in a supposed-to-be-erased region, based on the attribute information; and copying the read data from the first region of the memory buffer into a second region of the memory buffer, upon a determination that the page is included in the supposed-to-be-erased region.

In an embodiment, there is provided a controller which controls a storage including a plurality of blocks each divided into a plurality of pages. The controller may include: a memory buffer; a block manager configured to maintain attribute information associated with each of the blocks and pages; a read controller configured to read data from the memory array, and store the read data in a second region of the memory buffer when a page from which the data is read is included in a supposed-to-be-erased region, based on the attribute information; and a background operation processor configured to perform a management operation on the memory array using the read data copied into the second region of the memory buffer.

In an embodiment, a data storage device may include: a storage including a plurality of blocks each divided into a plurality of pages; and a controller including a memory buffer, and configured to manage attribute information on each of the blocks and pages of the storage, and control the storage. The controller may read data from the storage and stores the read data in a first region of the memory buffer, and copy the read data into a second region of the memory buffer when a page from which the data is read is included in a region to be erased, based on the attribute information.

In an embodiment, a data storage device may include: a storage including a plurality of blocks each divided into a plurality of pages; and a controller including a memory buffer, and configured to manage attribute information on each of the blocks and pages of the storage, and control communication between the storage and a host device. The controller may read data from the storage in response to a read request of the host device and stores the read data in a first region of the memory buffer, and copy the read data into a second region of the memory buffer when a page from which the data is read is included in a region to be erased, based on the attribute information.

In an embodiment, there is provided an operation method of a data storage device which includes a storage including a plurality of blocks each divided into a plurality of pages and a controller including a memory buffer and configured to control the storage. The operation method may include the steps of: managing, by the controller, attribute information on each of the blocks and pages; reading, by the controller, data from the storage, and storing the read data in a first region of the memory buffer; checking, by the controller, whether a page from which the data is read is included in a region to be erased, based on the attribute information; and copying the read data into a second region of the memory buffer, when the page is included in the region to be erased.

In an embodiment, there is provided a controller which controls a storage including a plurality of blocks each divided into a plurality of pages. The controller may include: a memory buffer; a block manager configured to manage attribute information on each of the blocks and pages; a read controller configured to read data from the storage, and store the read data in a second region of the memory buffer when a page from which the data is read is included in a region to be erased, based on the attribute information; and a background operation processor configured to perform a management operation on the storage using the read data copied into the second region of the memory buffer.

DETAILED DESCRIPTION

Hereinafter, a data storage device, an operation method thereof and a controller for the same according to the present disclosure will be described below with reference to the accompanying drawings through exemplary embodiments.

Figure 1:
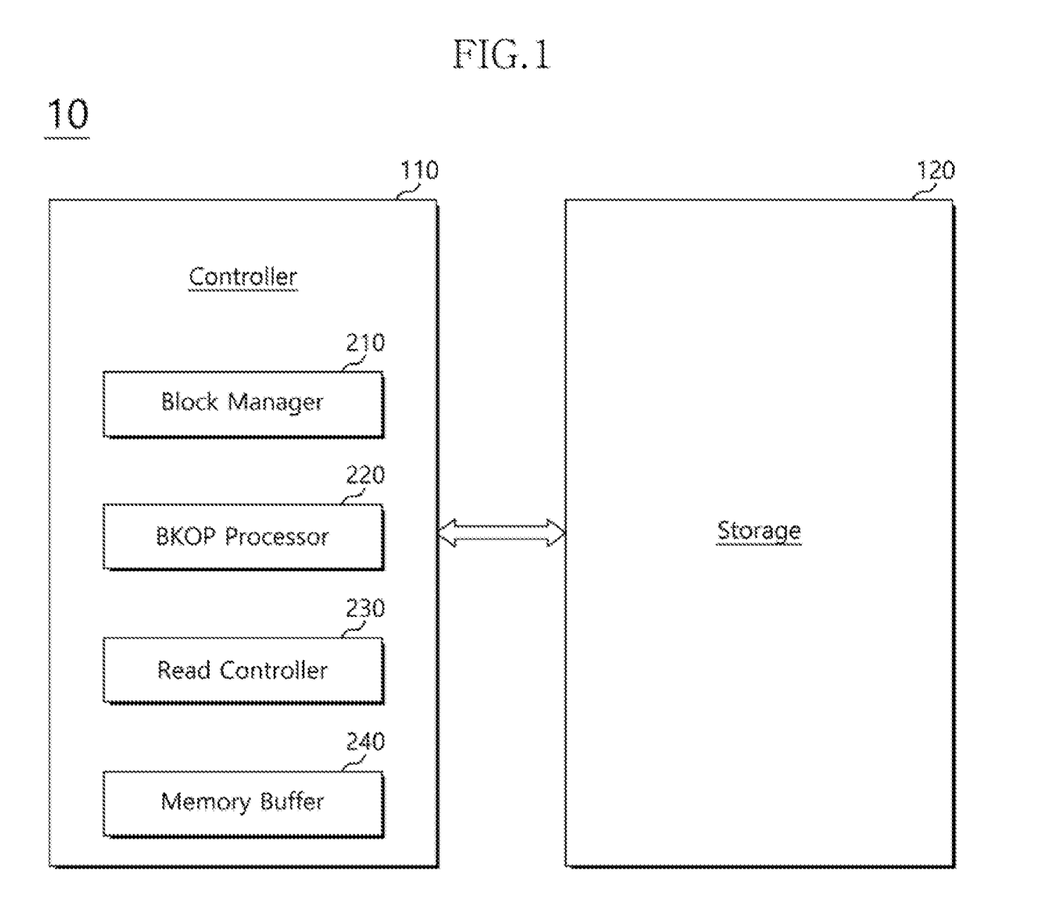
FIG. 1 is a diagram illustrating an example configuration of a data storage device based on an embodiment of the disclosed technology.

FIG. 1 is a diagram illustrating an example configuration of a data storage device based on an embodiment.

As shown in FIG. 1, the data storage device 10 may include a controller 110 and a storage 120.

The controller 110 may control the storage 120 in response to a request of a host device. For example, the controller 110 may control the storage 120 to write (program) data to the storage 120 according to a write (program) request of the host device. Also, the controller 110 may provide data stored in the storage 120 to the host device in response to a read request of the host device. In the context of this patent document, the host device can be any device capable of communicating information with the data storage device 10.

The storage (e.g., memory array) 120 may store and retrieve data, and the controller 110 manages the flow of data going to and from the storage 120. The storage 120 may include volatile memory devices, nonvolatile memory devices, or both. In an embodiment, examples of the non- volatile memory devices include, but are not limited to, an EEPROM (Electrically Erasable and Programmable ROM), NAND flash memory, NOR flash memory, PRAM (Phase-Change RAM), ReRAM (Resistive RAM), FRAM (Ferro-electric RAM) and STT-MRAM (Spin Torque Transfer Magnetic RAM). The storage 120 may include a plurality of semiconductor dies Die 0 to Die n, a plurality of semiconductor chips or a plurality of semiconductor packages. Furthermore, the storage 120 may function as single-level cells to store one bit of data per cell and/or multi-level cells capable of storing two or more bits of data per cell.

The data storage device 10 may further include a buffer memory. The buffer memory may be located inside or outside the controller 110 to temporarily hold data to be moved between the storage 120 and the controller 110 and/or between the data storage device 10 and the host when the data storage device 10 performs write operations or read operations responsive to operation requests from the host device.

In an embodiment, the controller 110 may include a block manager 210, a background operation (BKOP) processor 220, a read controller 230 and a memory buffer 240.

In an embodiment, the memory buffer 240 may include a first region which is allocated to store data read from the storage 120 by the read controller 230 and a second region which is allocated to store read data satisfying a preset condition among the read data. The data read from the storage 120 and stored in first region is copied to the second region if the data meets the preset condition.

The storage 120 may include one or more semiconductor dies. Each of the dies may be divided into one or more planes. Each plane may include a plurality of blocks each including a plurality of pages.

The block manager 210 may store, update and delete attribute information associated with the plurality of blocks of the storage 120. In some implementations, the attribute information may include physical addresses and states of the blocks (e.g., closed block/open block/free block/bad block), the purposes (data/firmware/over-provisioning) of the blocks, and validity (valid/invalid) information of pages constituting each of the blocks.

The background operation processor 220 may perform a management operation on the storage 120 regardless of a request of the host device. When an operation according to a host request is referred to as a foreground operation, the management operation on the storage 120, which is autonomously performed by the controller 110, may be referred to as a background operation. In an embodiment, examples of the background operation may include a wear-leveling operation, a garbage collection operation, a read reclaim operation or others.

The wear-leveling operation involves evenly distributing program/erase operations to avoid overusing certain blocks.

The garbage collection operation involves moving data from valid pages scattered in a block (e.g., source block or sacrificial block) to a new block to erase the old block (e.g., source block or sacrificial block), thereby securing a free block capable of storing user data.

The read reclaim operation involves moving data in a block to another block to avoid potential read disturb errors when the block has experienced a high number of read.

In some implementations, valid data can be copied from a valid page of a first block to another page of a second block as part of the wear-leveling operation, the garbage collection operation, or the read reclaim operation. A buffer memory may hold the data read out from the old page of the first block, and the data held by the buffer memory may be written to the new page of the second block when the first block is to be erased.

The read controller 230 may read data from the storage 120 in response to a request of the host device to provide the read data to the host device. In an embodiment, the read controller 230 may read data from a region corresponding to a physical address mapped to a logical address at the time when a read request is received from the host device, and may store the read data in the first region of the memory buffer 240. The read controller 230 may check whether the region (page or block) corresponding to the read request is a region (page or block) that is supposed to be erased (hereafter, referred to as "supposed-to-be-erased region"). If the page corresponding to the read request is a supposed-to-be-erased region, along with providing data read from the corresponding region (page or block) to the host device, the read controller 230 may copy the read data into a specific region within the controller 110, for example, the second region of the memory buffer 240. Furthermore, as the read controller 230 reads the data from the supposed-to-be-erased region and copies the read data to the second region of the memory buffer 240, the block manager 210 may invalidate the corresponding region (page or block).

In an embodiment, the supposed-to-be-erased region may include a region that is selected as a sacrificial block of a background operation. Each of the blocks constituting the storage 120 may include valid pages and invalid pages. The sacrificial block may be selected based on the number of valid pages in the blocks such that the block with the least valid page is erased and converted into a free block. In some implementations, the sacrificial block may be selected based on a least recently used (LRU) algorithm where the page to be erased is least recently used.

In an embodiment, when a certain block is selected as a sacrificial block, the controller 110 may read valid page information included in the sacrificial block and write the read information to another block (target block) to convert the sacrificial block into a free block by erasing data of the sacrificial block. That is, the valid data within the sacrificial block needs to be necessarily read during the background operation.

In some implementations, when a memory address corresponding to a host read request that is received during a background operation of the data storage device 10 is included in the sacrificial block, the controller 110 may read the data and store the read data in the first region of the memory buffer 240 responsive to the host read request, and then copy the data stored in the first region into the second region of the memory buffer 240. In an embodiment, the second region into which the read data is copied may be a region that is allocated for an internal operation of the data storage device 10 or a background operation. In an embodiment, the specific region (second region) may be a region that is used to temporarily store data moved during the background operation.

For the background operation, the controller 110 may copy the data of the sacrificial block into the first region of the memory buffer 240 through an internal read operation, and write data collected in the first region of the memory buffer 240 to a target block through an internal write operation. In an embodiment, the internal read/write operation may indicate an internal operation of the data storage device 10, which is distinguished from a read/write operation performed according to a request of the host device. For example, the internal read/write operation may indicate a read/write operation accompanied with the background operation.

Therefore, when a region for a host read request is a sacrificial block, the controller 110 copies the read data into the second region of the memory buffer 240 thus the sacrificial block does not need to be accessed for the background operation again. Therefore, since the same data can be prevented from being repeatedly read for the host read operation and the background operation, the number of internal operations can be reduced, which makes it possible to expect a performance improvement.

Figure 2:
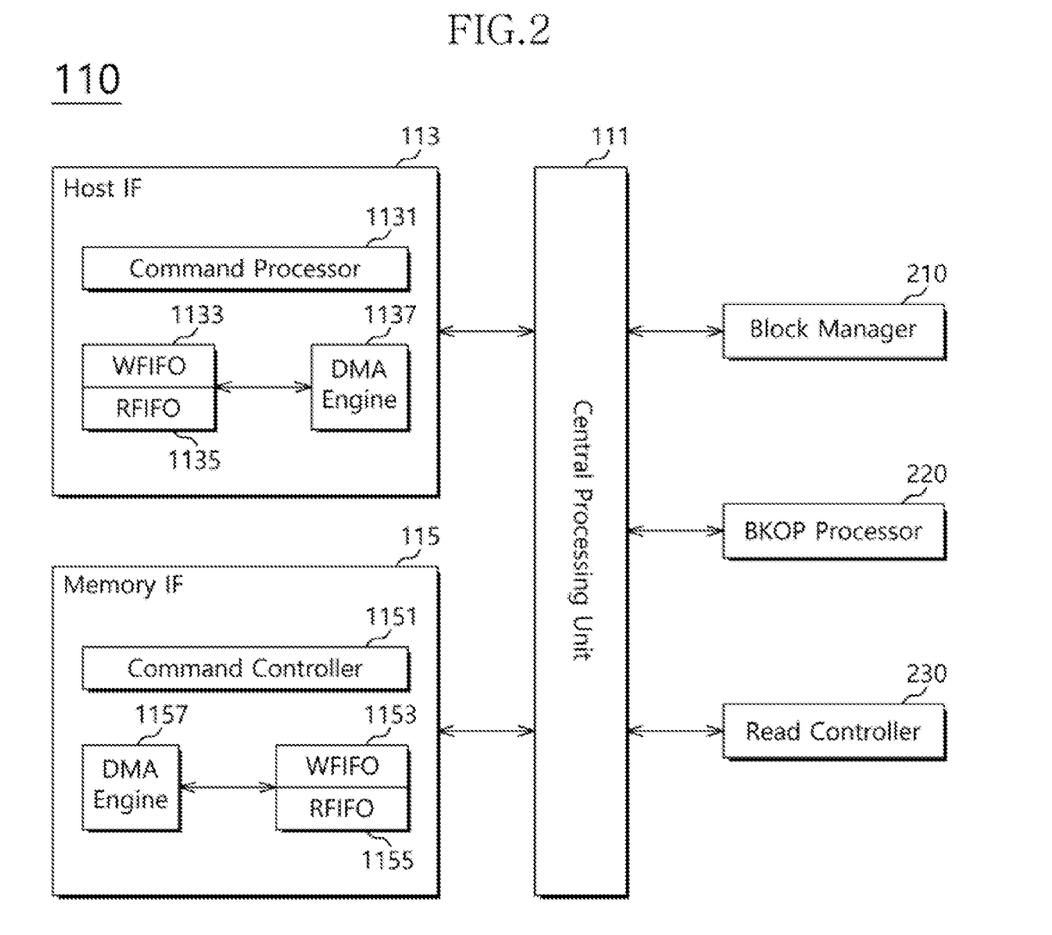
FIG. 2 is a diagram illustrating an example configuration of a controller based on an embodiment of the disclosed technology.

FIG. 2 is a diagram illustrating an example configuration of the controller based on an example embodiment.

Referring to FIG. 2, the controller 110 based on the present embodiment may include a central processing unit (CPU) 111, a host interface (I/F) 113, a memory I/F 115, a block manager 210, a background operation (BKOP) processor 220 and a read controller 230.

The CPU 111 may be configured and operable to transfer, to the host I/F 113, the memory I/F 115, the block manager 210, the background operation processor 220 and the read controller 230, control information required for reading or writing data from or to the storage 120. In an embodiment, the CPU 111 may operate according to firmware provided for various operations of the data storage device 10. In an embodiment, the CPU 111 may perform functions of a flash translation layer (FTL), including, but not limited to, garbage collection, address mapping, and/or wear-leveling to manage the storage 120. The FTL may also include error correction/detection modules for detecting and correcting erroneous bits of data read from the storage 120.

The host I/F 113 may provide a communication channel for receiving commands and clock signals from the host device and controlling data input/output, under control of the CPU 111. In particular, the host I/F 113 may provide a physical connection between the host device and the data storage device 10. Furthermore, the host I/F 113 may provide an interface with the data storage device 10 according to the bus format of the host device. The bus format of the host device may include one or more of standard interface protocols such as secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage).

The host I/F 113 may include a command processor 1131, a first write buffer (WFIFO) 1133, a first read buffer (RFIFO) 1135 and a first direct memory access (DMA) engine 1137.

The command processor 1131 may queue commands provided from the host device, schedule instructions to execute based on the commands, and provide the commands to the CPU 111.

The first write buffer 1133 may temporarily store write data provided by the host device.

The first read buffer 1135 may temporarily store data read from the storage 120.

The first DMA engine 1137 may transfer and store the data stored in the first write buffer 1133 into a buffer memory (not illustrated) provided inside or outside the controller 110 during a write operation, and read the data stored in the buffer memory and store the read data in the first read buffer 1135 during a read operation.

The memory I/F 115 may provide a communication channel for transmitting/receiving signals between the controller 110 and the storage 120. The memory I/F 115 may write the data stored in the buffer memory to the storage 120 under control of the CPU 111. Furthermore, the memory I/F 115 may transfer/store data read from the storage 120 into the buffer memory.

The memory I/F 115 may include a command controller 1151, a second write buffer (WFIFO) 1153, a second read buffer (RFIFO) 1155 and a second DMA engine 1157.

The command controller 1151 may transfer a control signal to the storage 120 based on a command provided from the CPU 111.

The second write buffer 1153 may temporarily store write data transferred from the buffer memory during a write operation.

The second read buffer 1155 may temporarily store data read from the storage 120 during a read operation.

The second DMA engine 1157 may transfer and store write data stored in the buffer memory into the second write buffer 1153 during the write operation, and transfer and store read data stored in the second read buffer 1155 into the buffer memory during the read operation. In some implementations, with the DMA engines, the operations of reading or writing from or to the butter memory can be performed without the CPU 111 being involved.

In some implementations, the second write buffer 1153 may be used as a region into which data read from a supposed-to-be-erased region are copied during the read operation.

The block manager 210 may manage the state (e.g., closed block/open block/free block/bad block) of each of the blocks constituting the storage 120.

The background operation processor 220 may process a management operation for the storage 120, for example, a background operation such as a wear-leveling, garbage collection or read reclaim operation without the host device being involved (e.g., regardless of a request of the host device at preset timing).

The read controller 230 may read data from the storage 120 according to a read request of the host device and provide the read data to the host device. In this case, in case data has been read from a supposed-to-be-erased region, the read controller 230 may copy the read data into a write buffer. For example, the data read from the supposed-to-be-erased region is copied to the second write buffer 1153.

In an embodiment, the read controller 230 may read data from a read region corresponding to a physical address mapped to a logical address provided with the read request of the host device. When the read region is included in the sacrificial block, the read region is a supposed-to-be-erased region, and in this case the read controller 230 may copy the data read from the read region into the second write buffer 1153, such that the read data can be used for a background operation.

As the read controller 230 copies the data read from the read region into the second write buffer 1153, the read region may be invalidated and erased later.

The background operation processor 220 reads data from the sacrificial block through an internal read operation and stores the read data in the write buffer, without rereading the data read during the host read request. In some implementations, since the corresponding region is invalidated after the host read request is processed, the data cannot be read.

By avoiding repeated read operations, the controller 110 can prevent data corruption that may occur due to the repeated read operations, and may improve the operation speed and performance of the data storage device 10.

Figure 3:
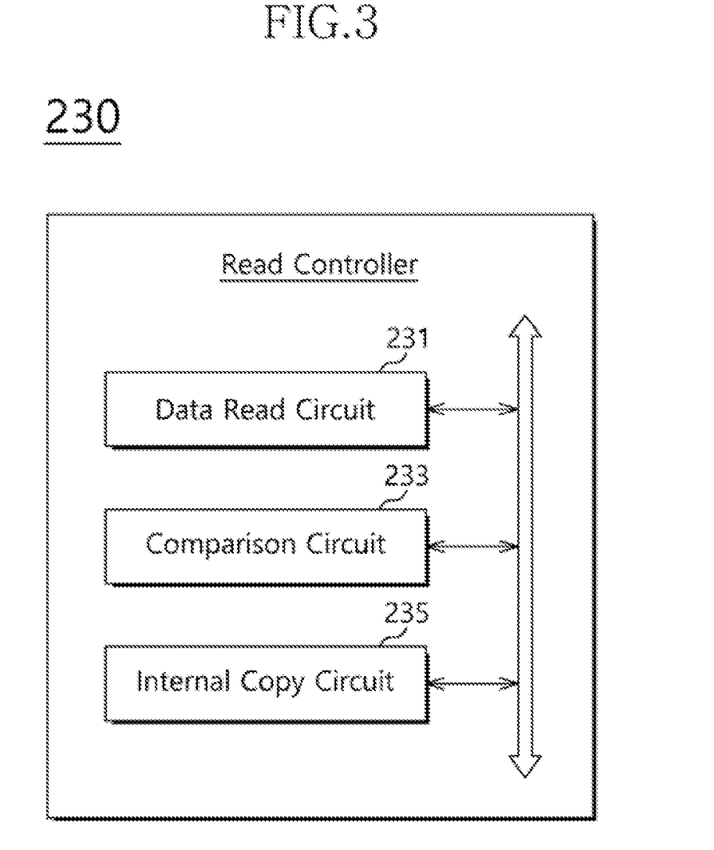
FIG. 3 is a diagram illustrating an example configuration of a read controller based on an embodiment of the disclosed technology.

FIG. 3 is a diagram illustrating an example configuration of the read controller based on some embodiments of the disclosed technology.

Referring to FIG. 3, the read controller 230 may include a data read circuit 231, a comparison circuit 233 and an internal copy circuit 235.

The data read circuit 231 may read data from the storage 120 in response to a read request of the host device. In an embodiment, the host device may transfer a read command and a logical address to be accessed to the data storage device 10 to request a read operation.

Based on the instructions provided by the CPU 111, the data read circuit 231 may access the storage 120 to read data, based on a physical address corresponding to the logical address provided by the host device during the read request, and store the read data in the second read buffer 1155. The read data stored in the second read buffer 1155 may be provided to the host device via the buffer memory and the host I/F 113.

The comparison circuit 233 may check whether a block that is being accessed is a block to be erased (e.g., a block selected as a sacrificial block), based on the physical address corresponding to the logical address provided by the host device during the read request.

When the check result of the comparison circuit 233 indicates that the block accessed to perform the read operation is a block to be erased, the internal copy circuit 235 may copy the read data, which is read by the data read circuit 231 and stored in the second read buffer 1155, into a write buffer. For example, the internal copy circuit 235 may copy the read data into the second write buffer 1153 within the memory I/F 115. As the internal copy circuit 235 copies the read data into the write buffer, the block manager 210 may classify the corresponding physical region (i.e., the region from which the copied data was read out) as an invalidated block.

When the amount of the data transferred to the write buffer by the internal read operation and/or the data copied into the write buffer during the host read operation reaches a predetermined size, the background operation processor 220 may write the data to another block ("target block"), and then convert the sacrificial block into a free block by erasing the sacrificial block.

Figure 4:
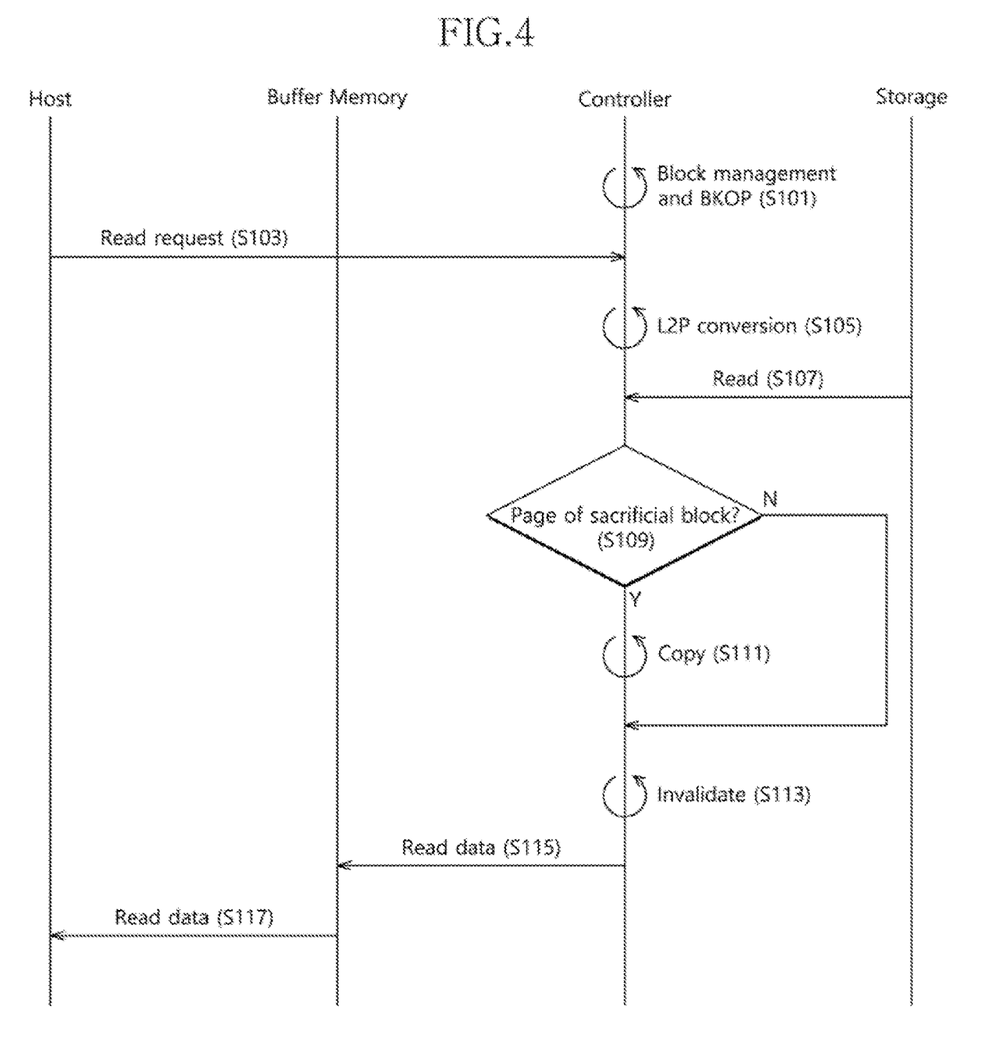
FIG. 4 is a flowchart for describing an operation method of the data storage device based on an embodiment of the disclosed technology.
Figure 5:
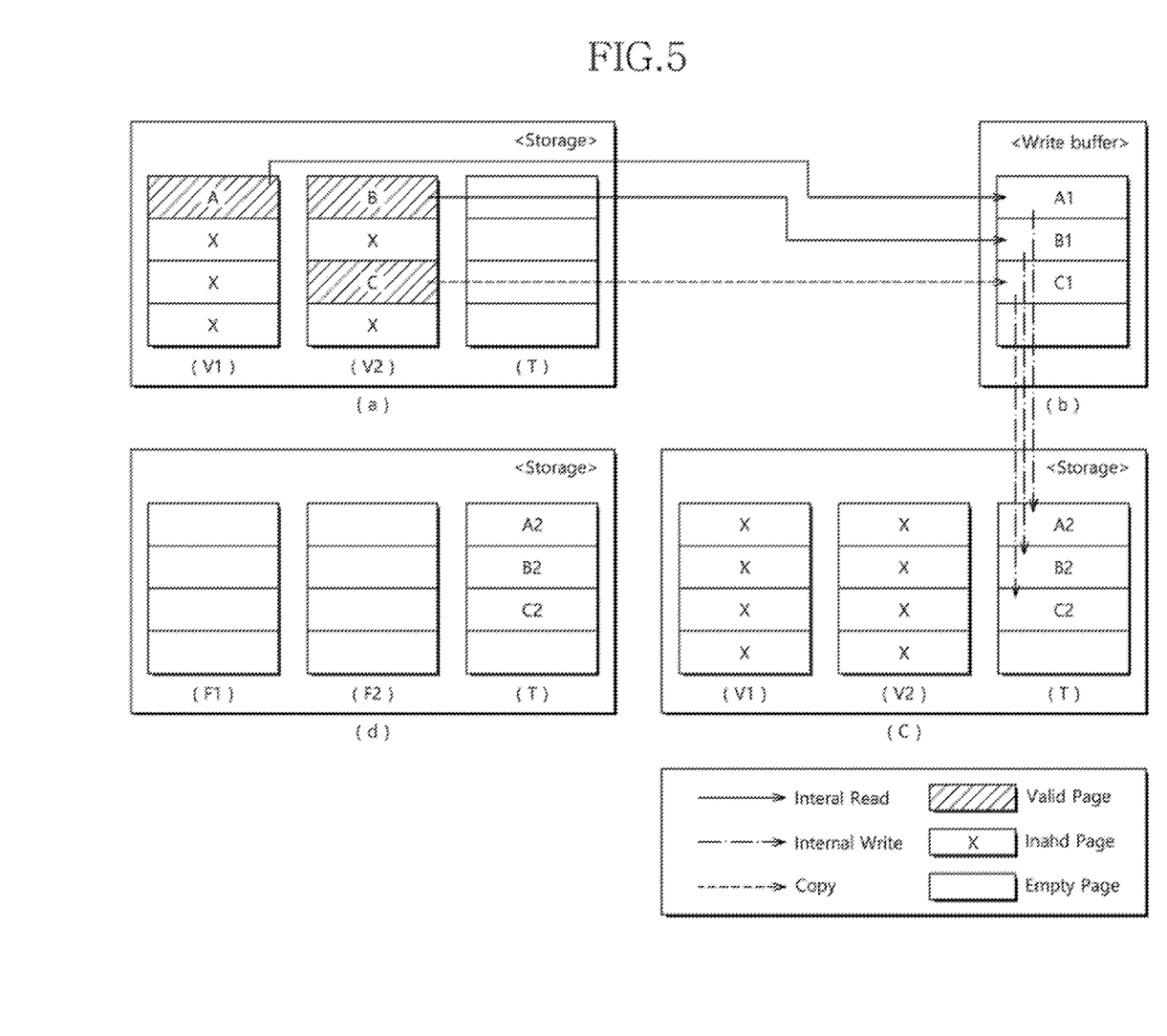
FIG. 5 illustrates the operation method of the data storage device based on an example embodiment of the disclosed technology.

FIG. 4 is a flowchart for describing an example operation method of the data storage device based on an embodiment. FIG. 5 further illustrates the operation method of the data storage device based on some embodiments of the disclosed technology. For example, such an operation method can include a garbage collection method.

As shown in FIGS. 4 and 5, the controller 110, at step S101, may perform management and background operations for pages/blocks/planes/dies constituting the storage 120 according to a preset standard to prolong the life of the storage device and to improve data integrity. In this way, the attributes (closed/open/free/bad) of the blocks constituting the storage 120, the physical addresses and purposes (data/firmware/over-provisioning) of the blocks, and the attribute (valid/invalid) information of the pages within each of the blocks may be maintained by the controller 110.

As a read request is transferred to the controller 110 of the data storage device 10 from the host device in step S103, the controller 110 may parse a host command and convert a logical address corresponding to the read request into a physical address in step S105.

The data read circuit 231 of the read controller 230 may access the storage 120 to read data from the physical address converted in step S105, and store the read data in the read buffer, for example, the second read buffer 1155 of the memory I/F 115 in step S107.

The comparison circuit 233 of the read controller 230 may check whether the physical address converted in step S105 is included in a supposed-to-be-erased region, in step S109. That is, the comparison circuit 233 may check whether the region accessed for the read operation is a block selected as a sacrificial block.

When the check result indicates that the region is a supposed-to-be-erased region (Y in step S109), the internal copy circuit 235 may copy the read data, which is read from the storage 120 and stored in the read buffer, into the write buffer, for example, the second write buffer 1153 of the memory OF 115, in step S111. As the data are read from the supposed-to-be-erased region, i.e. the region selected as the sacrificial region and transferred to the write buffer, the block manager 210 may invalidate the corresponding region in step S113.

The controller 110 may provide the data read from the storage 120 to the host device via the buffer memory and the host I/F 113 in step S115 and S117.

When the check result of step S109 indicates that the region accessed for the read operation is not a supposed-to-be-erased region (N in step S109), the controller 110 may provide the data read form the storage 120 to the host device without storing the read data in the write buffer, in steps S115 and S117.

As shown in FIG. 5, in order to perform a garbage collection operation among background operations, the controller 110 may select one or more sacrificial blocks and a target block according to a preset standard. As shown in example storage (a), two sacrificial blocks V1 and V2 and a target block T may be selected.

The selected sacrificial blocks V1 and V2 may include valid pages (A, B, and C) and invalid pages (X). The controller 110 may transfer data of the valid pages within the sacrificial blocks V1 and V2 to the first region (A1 and B1) of the memory buffer through the internal read operation. During this process, a host read request for a specific page C of the sacrificial block V2 may be made.

In this case, through the process described with reference to FIGS. 1 to 4, the read controller 230 may copy data C1 read from the specific page C of the sacrificial block V2 to the second region of the memory buffer, i.e. the write buffer (b).

Furthermore, the data A1, B1 and C1 collected in the write buffer may be written (A2, B2 and C2) to the target block T of storage (c) from the write buffer (b). Then, the sacrificial blocks V1 and V2, which include valid pages from which valid data has been moved may be erased and converted into free blocks F1 and F2 available for program operations as illustrated in example storage (d), which is converted from the example storage (a).

Figure 6:
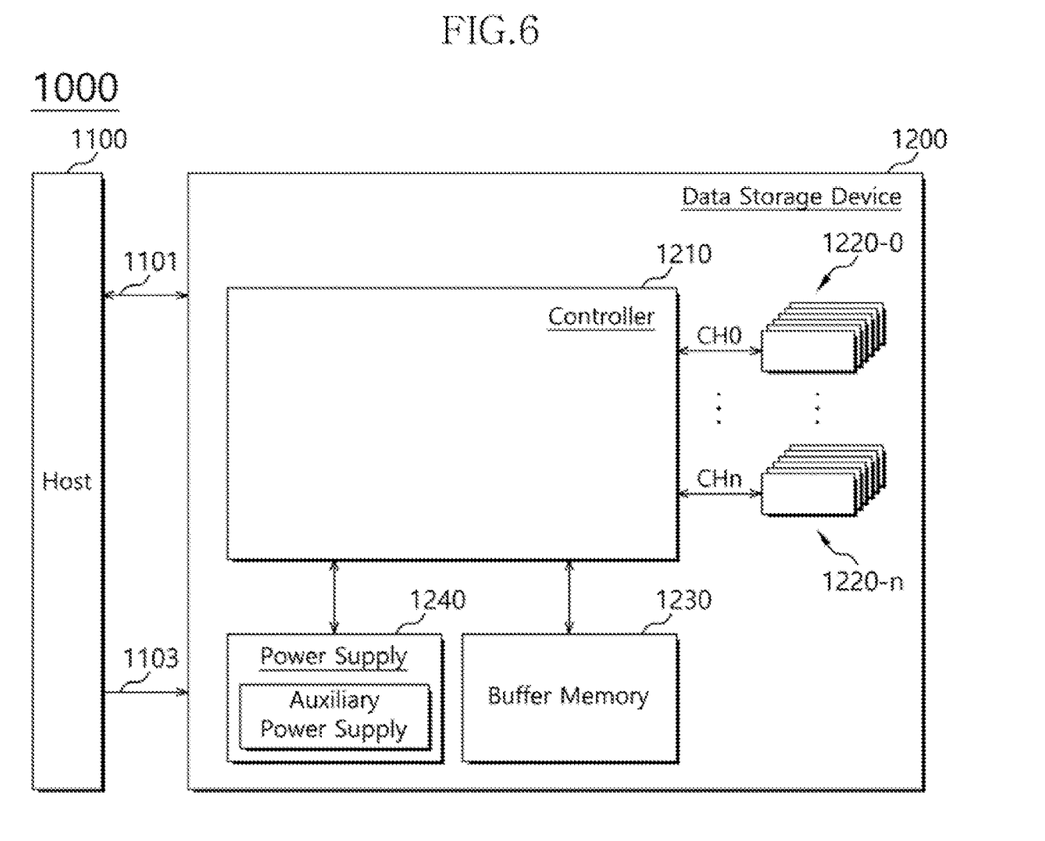
FIG. 6 is a diagram illustrating an example of a data storage system based on an embodiment of the disclosed technology.

FIG. 6 is a diagram illustrating an example of a data storage system 1000, based on an embodiment.

Referring to FIG. 6, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component, and a memory interface. In an embodiment, examples of the controller 1210 may include the controller 110 shown in FIGS. 1 and 2.

The host device 1100 may communicate with the data storage device 1200 through the signal connector 1101. The signal may include a command, an address, data, and so forth.

The controller 1210 may analyze and process the signal received from the host device 1100. The controller 1210 may control operations of internal function blocks according to a firmware or a software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 7:
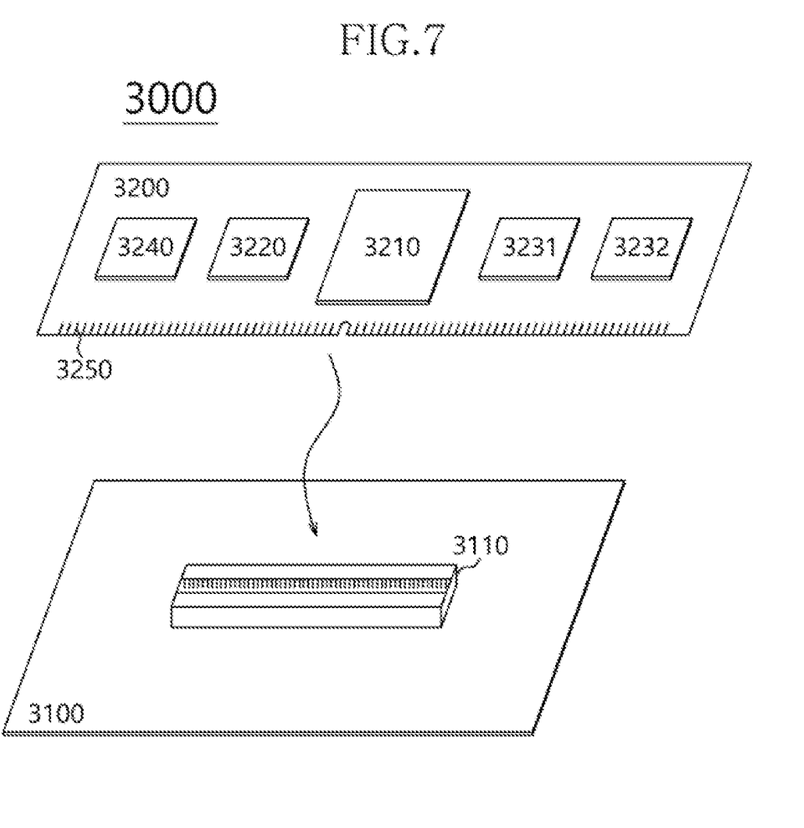
FIG. 7 illustrates an example of a data processing system based on an embodiment of the disclosed technology.

FIG. 7 is a diagram illustrating an example of a data processing system 3000, based on an embodiment. Referring to FIG. 7, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 8:
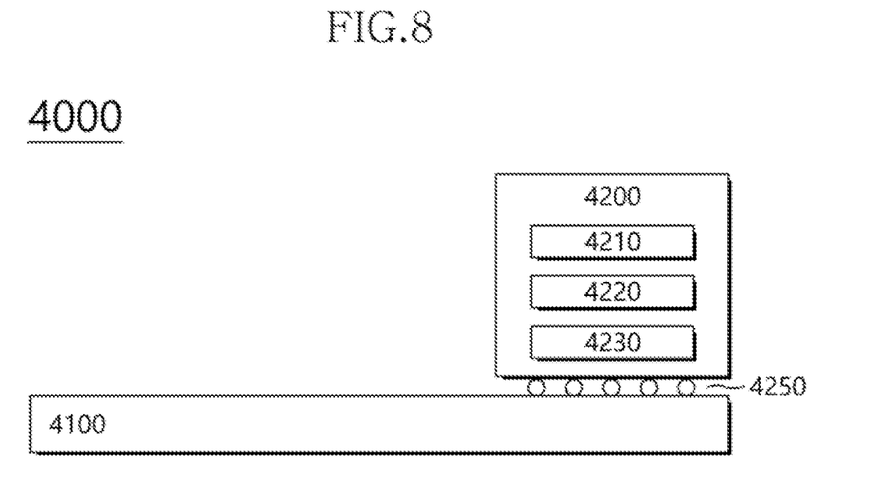
FIG. 8 illustrates an example of a data processing system based on another embodiment of the disclosed technology.

FIG. 8 is a diagram illustrating an example of a data processing system 4000 based on an embodiment. Referring to FIG. 8, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 9:
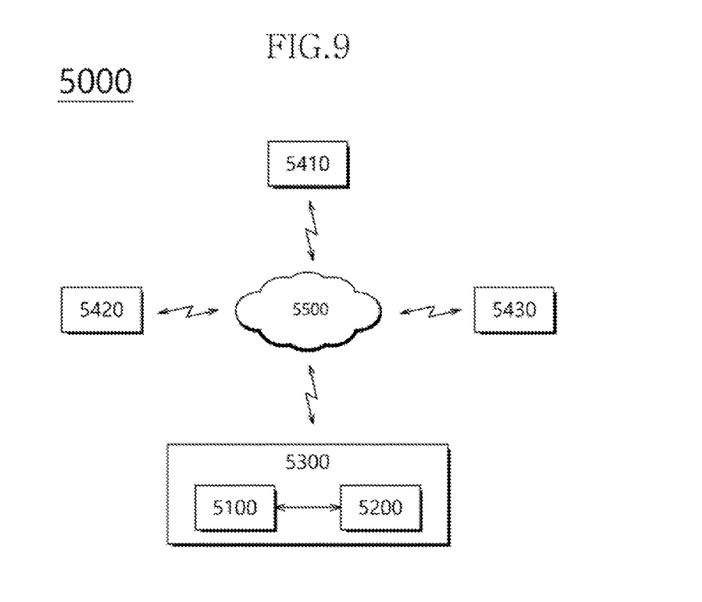
FIG. 9 illustrates an example of a network system including a data storage device based on an embodiment of the disclosed technology.

FIG. 9 is a diagram illustrating an example of a network system 5000 including a data storage device, based on an embodiment. Referring to FIG. 9, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 6, the memory system 3200 shown in FIG. 7, or the memory system 4200 shown in FIG. 8.

Figure 10:
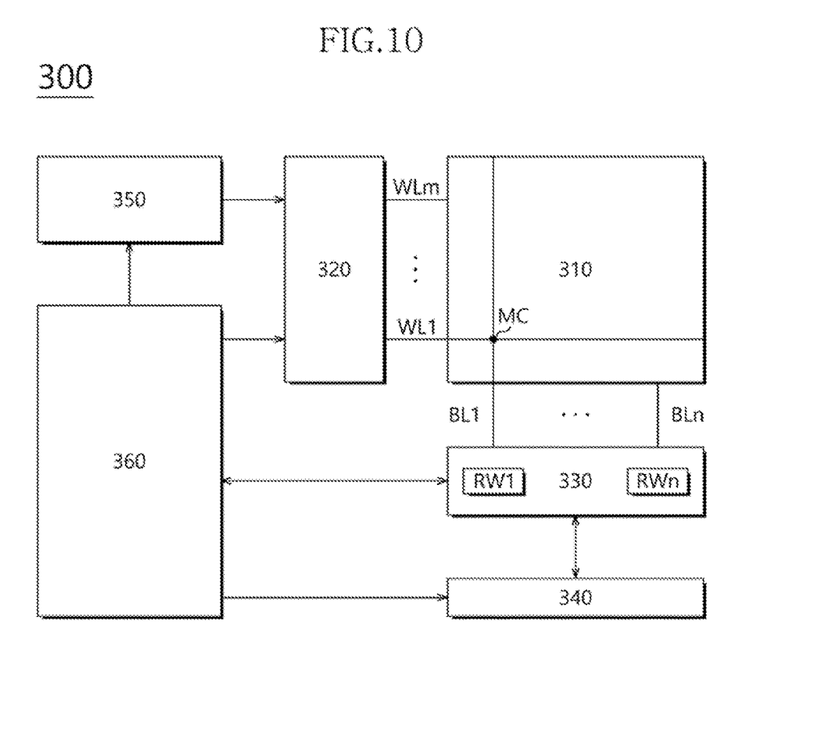
FIG. 10 is a block diagram illustrating an example of a nonvolatile memory device included in a data storage device based on an embodiment of the disclosed technology.

FIG. 10 is a block diagram illustrating a nonvolatile memory device 300 included in a data storage device, such as the data storage device 10, based on an embodiment. Referring to FIG. 10, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. A data storage device comprising:
   a memory array comprising a plurality of blocks, each block including a plurality of pages; and
   a controller in communication with the memory array and a host device and comprising a memory buffer, the controller configured to maintain attribute information associated with each block and each page of the memory array, the controller further configured to:
   receive a read request and the associated read address from the host device;
   read first data from the read address in the memory array based on the read request of the host device;
      store the first data in a first region of the memory buffer to output the first data to the host device; and
      copy the first data from the first region into a second region of the memory buffer upon a determination based on the attribute information that a page corresponding to the read address is included in a sacrificial block selected for a background operation region.

2. The data storage device according to claim 1, wherein the background operation comprises one or more of a wear-leveling operation, a garbage collection operation or a read reclaim operation.

3. The data storage device according to claim 1, wherein the controller is further configured to:
   classify the page, from which the first data copied into the second region of the memory buffer was read, as an invalid page.

4. The data storage device according to claim 1, wherein the controller is configured to collect second data copied into the second region of the memory buffer from the sacrificial block by an internal read operation and the first data copied in the second region of the memory buffer in response to the read request of the host device, and output the collected data to a target block selected according to a preset standard.

5. A method for operating a data storage device including a memory array and a controller, the memory array including a plurality of blocks, each block including a plurality of pages, the controller including a memory buffer and configured to control the memory array, the method comprising:
   maintaining, by the controller, attribute information on each of the blocks and pages;
   reading, by the controller, first data from a requested page in the memory array responsive to an external request, and storing the first data in a first region of the memory buffer to output the first data responsive to the external request;
   checking, by the controller, whether the requested page is included in a sacrificial block selected for a background operation, based on the attribute information; and
   copying the first data from the first region of the memory buffer into a second region of the memory buffer, upon a determination that the page is included in the sacrificial block.

6. The method according to claim 5, wherein the background operation comprises one or more of a wear-leveling operation, a garbage collection operation or a read reclaim operation.

7. The method according to claim 5, further comprising:
   classifying, by the controller, the page from which the first data copied into the second region of the memory buffer was read, as an invalid page, after copying the first data into the second region of the memory buffer.

8. The method according to claim 5, wherein the controller is coupled to a host device, and
   wherein the method further comprises:
   collecting, by the controller, second data transferred to the second region of the memory buffer from the sacrificial block by an internal read operation in addition to the first data copied in the second region of the memory buffer in response to the read request of the host device; and
   outputting the collected data to a target block selected according to a preset standard.

9. A controller in communication with a memory array and a host device including a plurality of blocks each divided into a plurality of pages, the controller comprising:
   a memory buffer;
   a block manager configured to maintain attribute information associated with each of the blocks and pages;
   a read controller configured to read first data from the memory array based on a read request of the host device during a background operation, and store the first data in a second region of the memory buffer when a page from which the first data is read is included in a sacrificial block selected for the background operation, based on the attribute information; and
   a background operation processor configured to perform a management operation on the memory array using at least the first data copied into the second region of the memory buffer.

10. The controller according to claim 9, wherein the background operation comprises one or more of a wear-leveling operation, a garbage collection operation and a read reclaim operation.

11. The controller according to claim 9, wherein as the read controller copies the first data into the second region of the memory buffer, the block manager classifies the page, from which the first data copied into the second region of the memory buffer was read, as an invalid page.

12. The controller according to claim 9,
wherein the background operation processor is configured to collect second data transferred to the second region of the memory buffer from the sacrificial block by an internal read operation and the first data stored in the second region of the memory buffer in response to the read request of the host device, and transfers the collected data to a target block selected according to a preset standard.

* * * * *